United States Patent [19]

Sanford

[11] 4,416,355

[45] Nov. 22, 1983

[54] CENTRIFUGALLY CONTROLLED DIFFERENTIAL TAPE REEL BRAKE

[75] Inventor: Herbert F. Sanford, Littleton, Colo.

[73] Assignee: Honeywell Inc., Minneapolis, Minn.

[21] Appl. No.: 477,284

[22] Filed: Mar. 21, 1983

Related U.S. Application Data

[63] Continuation of Ser. No. 334,777, Dec. 28, 1981.

[51] Int. Cl.³ .................... B65H 23/06; B60T 13/06
[52] U.S. Cl. .................................. 188/185; 188/171;
242/75.47; 242/156.2
[58] Field of Search ............... 242/75.4, 75.47, 156,
242/156.2, 204; 188/171, 185, 187

[56] References Cited

U.S. PATENT DOCUMENTS

| 1,067,454 | 7/1913 | Atwood | 188/185 |
| 2,217,464 | 10/1940 | Arnold | 188/171 |

FOREIGN PATENT DOCUMENTS

| 31219 | 5/1904 | Switzerland | 188/187 |
| 522359 | 4/1974 | U.S.S.R. | 188/185 |
| 632851 | 11/1978 | U.S.S.R. | 188/185 |

*Primary Examiner*—Stuart S. Levy
*Assistant Examiner*—Lloyd Doigan

*Attorney, Agent, or Firm*—Mitchell J. Halista; Charles Ungemach

[57] ABSTRACT

A centrifugally controlled differential brake uses a plurality of disc brake pads which are urged against a non-rotating braking surface. The disc brake pads are each slidably mounted on a respective one of a plurality of first support rods and spring loaded to a position at one end of the corresponding rods. The other ends of the plurality of support rods are attached to a hub on which the rods are radially arranged and equally spaced. The hub is connected to a shaft to which a braking torque is to be applied. Each of the brake discs is connected by a connecting link to a respective one of a plurality of centrifugal weights which are each slidably mounted on a respective one of a plurality of second support rods. The second support rods are radially attached to the hub and equally spaced with each of the second rods being aligned diametrically opposite a respective one of the first rods. Thus, the springs urge the brake discs to an outer diameter position while the centrifugal weights are correspondingly positioned at an inner diameter position. During a rotation of the shaft, hub and first and second rods, a movement of the centrifugal weights on their respective second support rods counteracts the effect of the springs to urge the brake discs toward an inner diameter position in proportion to the rotational speed to vary the braking effect by a variation in the length of the torque arm of the brake disc.

20 Claims, 2 Drawing Figures

CENTRIFUGALLY CONTROLLED DIFFERENTIAL TAPE REEL BRAKE

This is a continuation of application Ser. No. 334,777 filed on Dec. 28, 1981.

BACKGROUND OF THE INVENTION

1. Field of the Invention

The present invention relates to tape transports. More specifically, the present invention is directed to a tape reel brake for a tape transport.

2. Description of the Prior Art

On tape recorders, tape reel brakes are used to prevent excessive spilling of tape in the event of power failure or other loss of control over a tape spooling operation. As the tape is spooled from one reel to another the effective reel diameter, i.e., the height of the wound tape, changes. The conventional constant brake torque generating reel brake, consequently, provide a compatible braking effect for only one effective reel diameter, i.e., the braking effect is either excessive or insufficient for other effective reel diameters. Additionally, conventional tape reel brakes employ some sort of differential braking that is dependent on reel rotation to provide a trailing reel with a higher brake torque than the leading reel although also with only a fixed or constant braking effect. The inherent problem with this conventional approach is that it cannot compensate for the change in momentum during the change in the amount of tape on the tape reel, i.e., a full reel of tape has considerably more momentum than an empty one so that it needs more brake torque to stop in the same time as an empty tape reel. Accordingly, it would be desirable to provide a reel brake which maintains the characteristic of differential braking torque but that it also provides a braking torque that is dependent on the difference in a momentum of the tape reels as the tape is removed and added therefrom.

SUMMARY OF THE INVENTION

An object of the present invention is to provide an improved tape reel brake having a variable braking affect correlated to the amount of tape on the tape reel.

In accomplishing this and other objects, there has been provided, in accordance with the present invention, a tape reel brake having a plurality of disc brake pads that are urged against a braking surface and which are centrifugally actuated to move between a first and a second radial position with respect to a shaft coaxial with the tape reel and driven thereby.

BRIEF DESCRIPTION OF THE DRAWING

A better understanding of the present invention may be had when the following detailed description is read in connection with the accompanying drawings, in which.

DESCRIPTION OF THE PREFERRED EMBODIMENT

1. DETAILED DESCRIPTION

Figure 1:
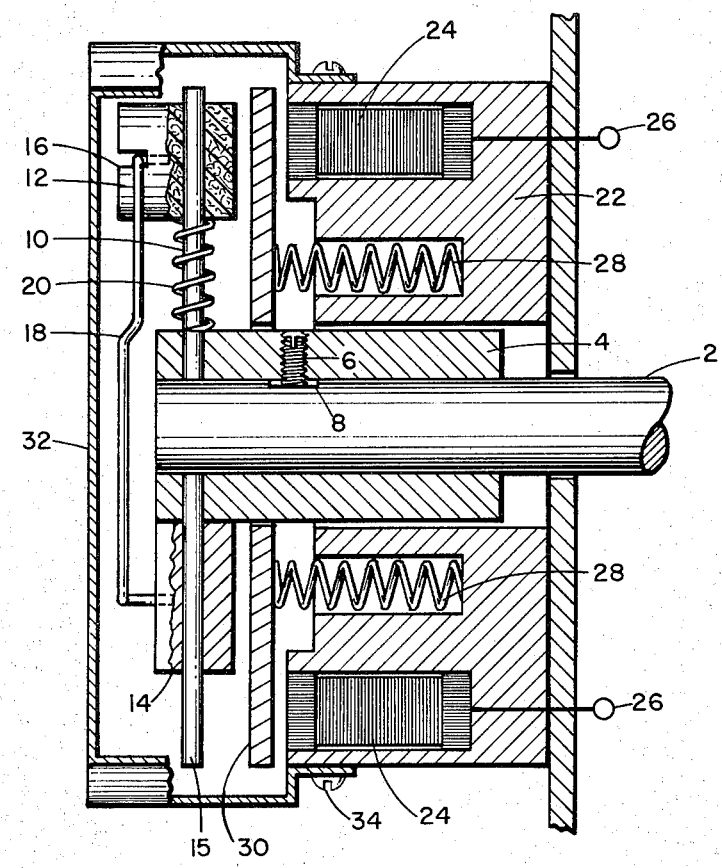
FIG. 1 is a cross-sectional illustration of an example of a tape reel brake embodying the present invention and FIG. 2 is a side view of the brake shown in FIG. 1.
Figure 2:
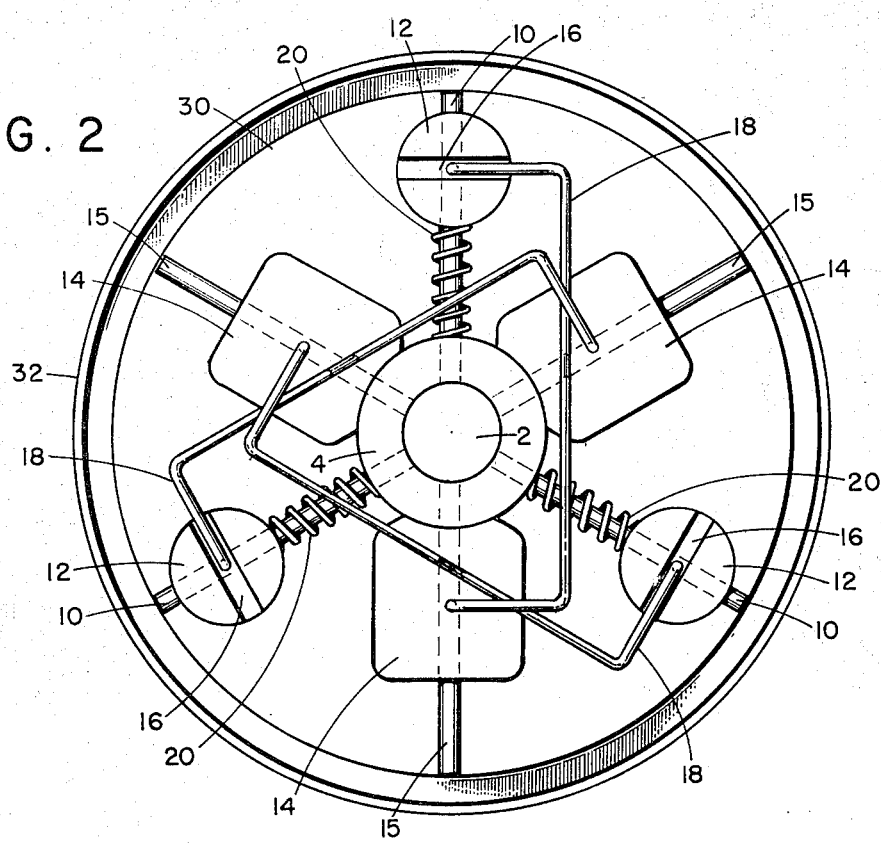

Referring to FIGS. 1 and 2, there is shown a tape reel brake embodying an example of the present invention and being mounted on a shaft 2 which is connected to a tape reel (not shown). The shaft 2 is connected to a sleeve or hub 4 by a set screw 6 passing through the hub 4 into a recess 8 in the shaft 2. A first plurality of support rods 10 are equally spaced and radially mounted on the end of the hub 4. A plurality of disc brake pads 12 are arranged to slide on the rods 10, i.e., each of the pads 12 is concentrically mounted on a respective one of the rods 10 and arranged to slide thereon. A plurality of weights 14 are each arranged to slide on respective ones of a plurality of second support rods 15. The second rods 15 are also equally spaced and are each located diametrically opposite a respective one of the first rods 10. Each of the disc pads 12 is provided with a groove 16 across one end of the disc brake pad 12. A plurality of connecting links 18 are arranged to innerconnect each of the disc brake pads 12 with a respective one of the centrifugal weights 14. Specifically, one end of each of the connecting links 18 is embedded in the groove 16 of a respective one of the disc brake pads 12 while the other end of each of the connecting links 18 is embedded into a corresponding one of the centrifugal weights 14.

A plurality of springs 20 are arranged to urge respective ones of the disc brake pads 12 to an outermost radial position on the corresponding support rod 10. Specifically, each of the springs 20 is wound on a corresponding one of the support rods 10 between the disc brake pad 12 and the hub 4. An electromagnetic structure 22 is supported on the tape transport apparatus and is used to selectively apply the brake to the tape reel. An electromagnetic coil 24 is located in the structure 22 and is connected by terminals 26 to an energizing source (not shown). Also located in the electromagnetic structure 22 are a plurality of springs 28 which are arranged to extend parallel to the shaft 2 between the electromagnetic structure 22 and a disc brake rotor 30. The disc brake rotor 30 is arranged to slide longitudinally on the hub 4 while having a limited rotational motion as a result of the restraint provided by the innerconnection of the rotor 30 with the electromagnetic structure 22 by the springs 28. A cover 32 is attached to the electromagnetic structure 22 by screws 34 to provide an enclosure for the brake.

DESCRIPTION OF OPERATION

The tape reel brake of the present invention provides a variable braking effect by using the centrifugal weights 14 to position the disc brake pads 12 at a radial position which is dependent on the angular velocity of the shaft 2 and, hence, the angular velocity of the tape reel. Thus, the position of the disc brake pads 12 is dependent on the amount of tape on the corresponding tape reel. Since the momentum and angular velocity of the tape reel are directly proportional, sensing of the reel velocity is a representation of momentum. Since the reel velocity change is inversely proportional to the brake torque required, the brake of the present invention is effective to change the braking effect in proportion to the amount of tape on the tape reel and, hence, the amount of momentum exhibited by the tape reel. Thus, the weights 14 can move radially in and out on the rods 15 in response to a rotation of the shaft 2 and hub 4 to move the respective ones of the disc brake pads 12 on the rods 10. Since the torque produced by the disc brake pads on the rotor 30 is proportional to their radial position, or torque arm, the disc brake torque is also varied. Additionally, whe the brake is used on both tape reels, the brake has a differential action in that it responds to the direction of rotation to maintain the variable braking effect between the tape reels.

Accordingly, it may be seen that there has been provided, in accordance with the present invention an improved tape reel brake having a variable braking effect correlated to the amount of tape on the tape reel.

The embodiments of the invention in which an exclusive property or privilege is claimed are defined as follows:

1. A brake comprising
an input shaft means for connecting the brake to a rotating device to be braked,
a support rod radially attached to said shaft means,
a disc brake pad slideably mounted on said support rod,
a second support rod radially attached to said shaft means diametrically opposite to said first support rod,
a weight slideably mounted on said second support rod,
a connecting link interconnecting said pad and said weight and
a braking surface means in contact with said pad for braking said shaft means whereby the radial position of the disc brake pad and interconnected weight is dependent upon the angular velocity of the shaft means to provide variable braking torque.

2. A brake as set forth in claim 1 and further including a spring means for biasing said pad to a radially outer position on said first support rod.

3. A brake as set forth in claim 1 wherein said braking surface means includes selectively energizable means for interrupting said contact between said braking surface means and said pad.

4. A brake as set forth in claim 1 wherein said braking surface means includes a brake rotor and spring means for urging said rotor against said pad while restraining said rotor from rotation.

5. A brake as set forth in claim 4 wherein said braking surface means includes selectively energizable means arranged to oppose said spring means for interrupting a contact between said pad and said rotor.

6. A brake as set forth in claim 5 and further including a second spring means for biasing said pad to a radially outer position on said first support rod.

7. A brake as set forth in claim 6 wherein said second spring means includes a coil spring encircling said first support rod and extending between said pad and said input shaft means.

8. A brake comprising
an input shaft means for connecting the brake to a rotating device to be braked,
a plurality of first support rods radially attached to said shaft means,
a plurality of disc brake pads each slideably mounted on a respective one of said support rods,
a plurality of second support rods radially attached to said shaft means each of said second support rods being diametrically opposite to a corresponding one of said first support rods,
a plurality of weights each slideably mounted on a respective one of said second support rods,
a plurality of connecting links with each link interconnecting respective ones of said pads and weights and
a braking surface means in contact with said pads for braking said shaft means whereby the radial position of the disc brake pads and each interconnected weight is dependent upon the angular velocity of the shaft means to provide variable braking torque.

9. A brake as set forth in claim 8 wherein said first and second support rods are equally spaced on said shaft means.

10. A brake as set forth in claim 8 and further including a plurality of spring means for biasing a corresponding one said pad to a radially outer position on a respective one of said first support rods.

11. A brake as set forth in claim 10 wherein said spring means each includes a coil spring encircling a respective one of said first support rods and extending between a corresponding one of said pads and said shaft means.

12. A brake as set forth in claim 8 wherein said braking surface means includes a brake rotor and spring means for urging said rotor against said pads while restraining said rotor from rotation.

13. A brake as set forth in claim 12 wherein said braking surface means includes selectively energizable means arranged to oppose said spring means for interrupting a contact between said pads and said brake rotor.

14. A brake comprising
an input shaft means for connecting the brake to a rotating device to be braked,
brake pad means,
support means attached to said shaft for slideably supporting said brake pad means between a first and a second radial position with respect to said shaft,
braking surface means in contact with said brake pad means for braking said shaft means and
centrifugally actuated means connected to said brake pad means and said shaft means to control the radial position of the brake pad means inversely dependent on the angular velocity of said shaft means to provide variable braking torque.

15. A brake as set forth in claim 14 wherein said support means includes a spring means for biasing said brake pad means to a radially outer position of said first and second radial positions.

16. A brake as set forth in claim 14 wherein said centrifugally mounted means includes weight means arranged to be rotated coaxially with said shaft means and connecting link means for interconnecting said pad and said weight means.

17. A brake as set forth in claim 14 wherein said braking surface means includes a brake rotor and spring means for urging said rotor against said brake pad means while restraining said rotor from rotation.

18. A brake as set forth in claim 17 wherein braking surface means also includes selectively energizable means arranged to oppose said spring means for interrupting a contact between said brake pad means and said rotor.

19. A brake as set forth in claim 18 wherein said support means includes a spring means for biasing said brake pad means to a radially outer position of said first and second radial positions.

20. A brake as set forth in claim 18 wherein said selectively energizable means includes an electromagnetic coil arranged to attract said rotor when in an electrically energized state.

* * * * *